United States Patent [19]

Berry

[11] 4,034,379
[45] July 5, 1977

[54] INK JET WRITING PROCESS AND APPARATUS

[75] Inventor: James M. Berry, Deerfield, Ill.

[73] Assignee: Teletype Corporation, Skokie, Ill.

[22] Filed: Nov. 13, 1972

[21] Appl. No.: 306,104

[52] U.S. Cl. .................................. 346/1; 346/75
[51] Int. Cl.² .................................. G01D 15/18
[58] Field of Search .......................... 346/1, 75

[56] References Cited

UNITED STATES PATENTS

| | | | |
|---|---|---|---|
| 3,298,030 | 1/1967 | Lewis et al. | 346/75 |
| 3,739,395 | 6/1973 | King | 346/75 |
| 3,769,630 | 10/1973 | Hill et al. | 346/75 |
| 3,769,631 | 10/1973 | Hill et al. | 346/75 |

Primary Examiner—Joseph W. Hartary
Attorney, Agent, or Firm—W. G. Dosse; M. Pfeffer

[57] ABSTRACT

Ink drops in an uninterrupted succession are charged for deflection into successive waves of corresponding drops, all of which impinge along a single straight line of a carrier. Each drop in each wave is deflected to a station on the carrier discrete from the other stations and is spaced from other drops at the same station. Corresponding drops in each wave are deflected to the same station on the carrier. The drops in each wave impinge the carrier in a selected order. Corresponding drops in each wave impinge the carrier in the same order.

28 Claims, 6 Drawing Figures

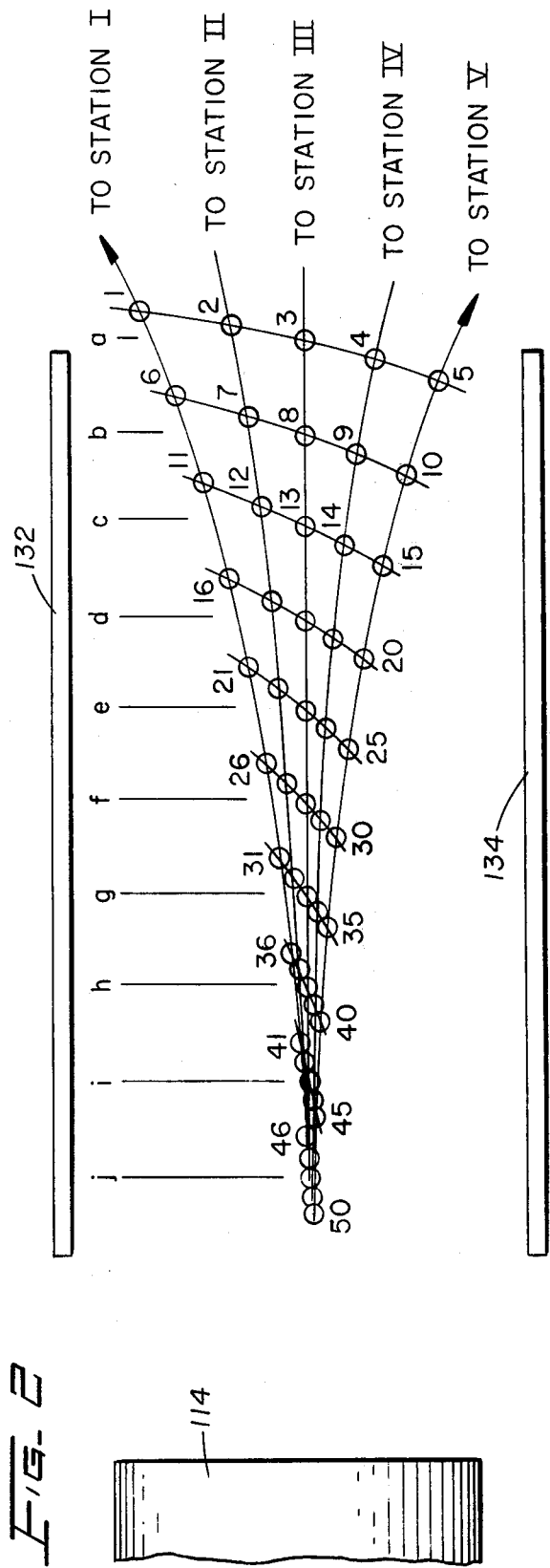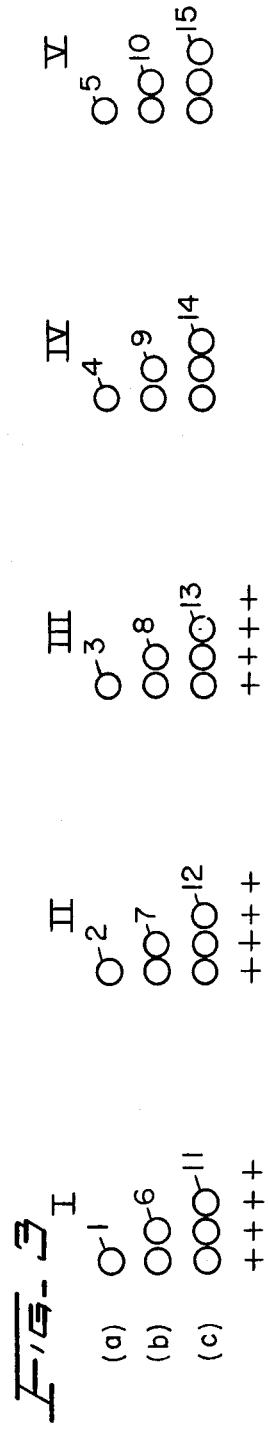

INK JET WRITING PROCESS AND APPARATUS

FIELD OF THE INVENTION

The present invention relates to ink jet writing. Particularly, it relates to writing by electrostatically deflecting an uninterrupted succession of "squirted" charged ink drops into successive waves for effecting line tracing transversely of a carrier for records on which the drops impinge. Specifically, it relates to a process and means for controlling the spacing between successively issued ink drops in a squirting ink jet writing process to maximize similarity in their ambient conditions in flight across a span between an issuing nozzle and a carrier for records.

BACKGROUND OF THE INVENTION

In a conventional "squirting" ink jet process for writing, a succession of ink drops is propelled along an axis with a force sufficient to transfer the drops across a span to a carrier for records spaced from the ink issuing source. Uniform frequency of drop formation is enhanced by the application to the issuing ink mass of a uniform high speed alternation; and the drops are electrically charged with selected voltages. When charged drops in a set coact with an electrostatic field which is disposed between the stream issuing source and the carrier, selected drops will be deflected in a writing mode transversely of the axis, each for impinging the carrier at a respective matrix position. Others of said drops will be deflected in a non-print, delete, or omit mode against a mask or ink catcher to prevent them from reaching the carrier. Ideally, in the conventional process, when a uniformly stepped voltage is applied to an uninterrupted succession of ink drops in a print mode they should form a single wave to impinge the carrier in succession at adjoining equally spaced sites to matrix positions to form a completed straight line of increasing length.

The ideal conditions, however, do not prevail, in the conventional process, as the ambient conditions for some of the drops in a writing mode vary. For example, a first drop in an uninterrupted succession will encounter more resistance to air than an ensuing drop. Responsively, the speed of the first drop will be less than the speed of the ensuing drop. Consequently, the former drop may be overtaken by and coalesce with the latter, thereby upsetting the desired drop size and spacing on the carrier. The desired spacing of drops also may be upset in flight due to the coaction of the electrostatic fields generated thereabout by their applied charges. Consequently, affected drops may not reach their intended positions on a carrier.

SUMMARY OF THE INVENTION

It is an object of this invention to improve the quality of ink jet printing by maximizing the similarity of ambient conditions about charged drops in an ink jet writing process.

It is a further object of the invention to minimize interference with the intended movement of ink drops in an ink jet writing process in consequence of ambient factors including aerodynamic and electrostatic conditions.

The foregoing, and other objects of the invention which will become apparent from the ensuing detailed description of the invention, are attained, according to one aspect of the invention, in a writing process wherein electrically charged ink drops from a stream are deflected by an electrostatic field in a span between an issuing member and a carrier for records to produce a pattern by impinging selected drops on the carrier. In said process, a plurality of consecutive waves of drops are formed for impinging the carrier along a single written line. Each drop in a wave is applied in a discrete position at a station along said line to place corresponding drops from successive waves in said line at different locations at the same station.

From another aspect, said objects are achieved in a writing process by electrically charging elements from a stream, and electrostatically deflecting the charged elements in a span between an issuing member and a carrier for records for producing thereon a pattern. To produce a line on the carrier, the charged elements in a first succession are deflected to a plurality of positions, respectively, at a succession of stations on a carrier. Each station is spaced from and aligned with the others. The charged elements, respectively, in a second succession are directed to a plurality of sites at said stations, respectively, and in the same sequence as corresponding drops in the first succession. Each site is spaced from and in alignment with the others and is located at a place different from the position at its station.

BRIEF DESCRIPTION OF THE DRAWINGS

In the ensuing detailed description of the invention, reference is had to the accompanying drawings on which:

FIG. 2 is a plot of the instantaneous distribution, seen from above, of a set of charged ink drops from an uninterrupted succession in flight for generating a single line on the carrier shown in FIG. 1, and following their coaction with an electrostatic field;

FIG. 3 is a plot illustrating the time sequence in which the drops in the waves of FIG. 2 are applied to the carrier to write a line in accordance with the invention;

DETAILED DESCRIPTION OF THE INVENTION

Figure 1:
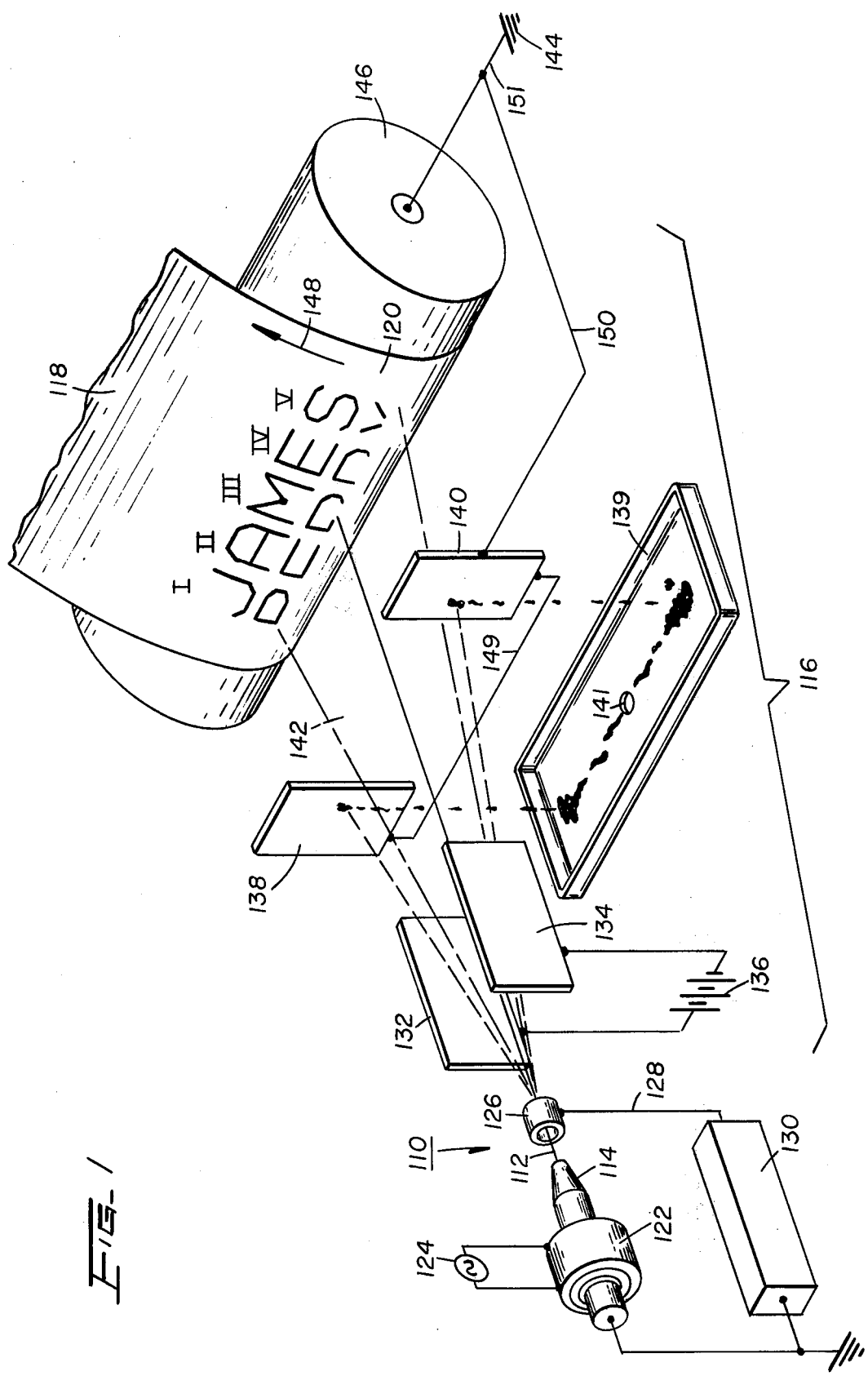
FIG. 1 is a scheme of apparatus in accordance with and illustrating the process embodied in the invention.

Referring now to FIG. 1 of the drawings, an electrostatic printing apparatus, generally designated 110, is of the type commonly referred to as a "squirting" jet printer. Ink issues from an issuing element thereof, such as a nozzle 114, in a stream along an axis 112. By any suitable means (not shown) a propelling force is applied to the ink sufficient to transfer the issued ink mass across a span 116 from the nozzle 114 to a carrier 118 for records. In span 116 the ink stream is broken into a succession of elements or drops, in a manner heretofore known in the art, to impinge a segment 120 of the carrier which is disposed in a plane perpendicular to axis 112 for writing.

To the end that the drops will be generated uniformly and will be of uniform size and spacing, a uniformly alternating disturbance is applied to the ink mass to induce a wave or pulsation in the issuing ink stream. Herein, the stream is mechanically modulated by a pulsating or alternating piezo-electric transducer 122. It is mounted about the nozzle 114 and excited by the signal from an alternating current generator 124 to which the transducer is connected.

Figure 6:
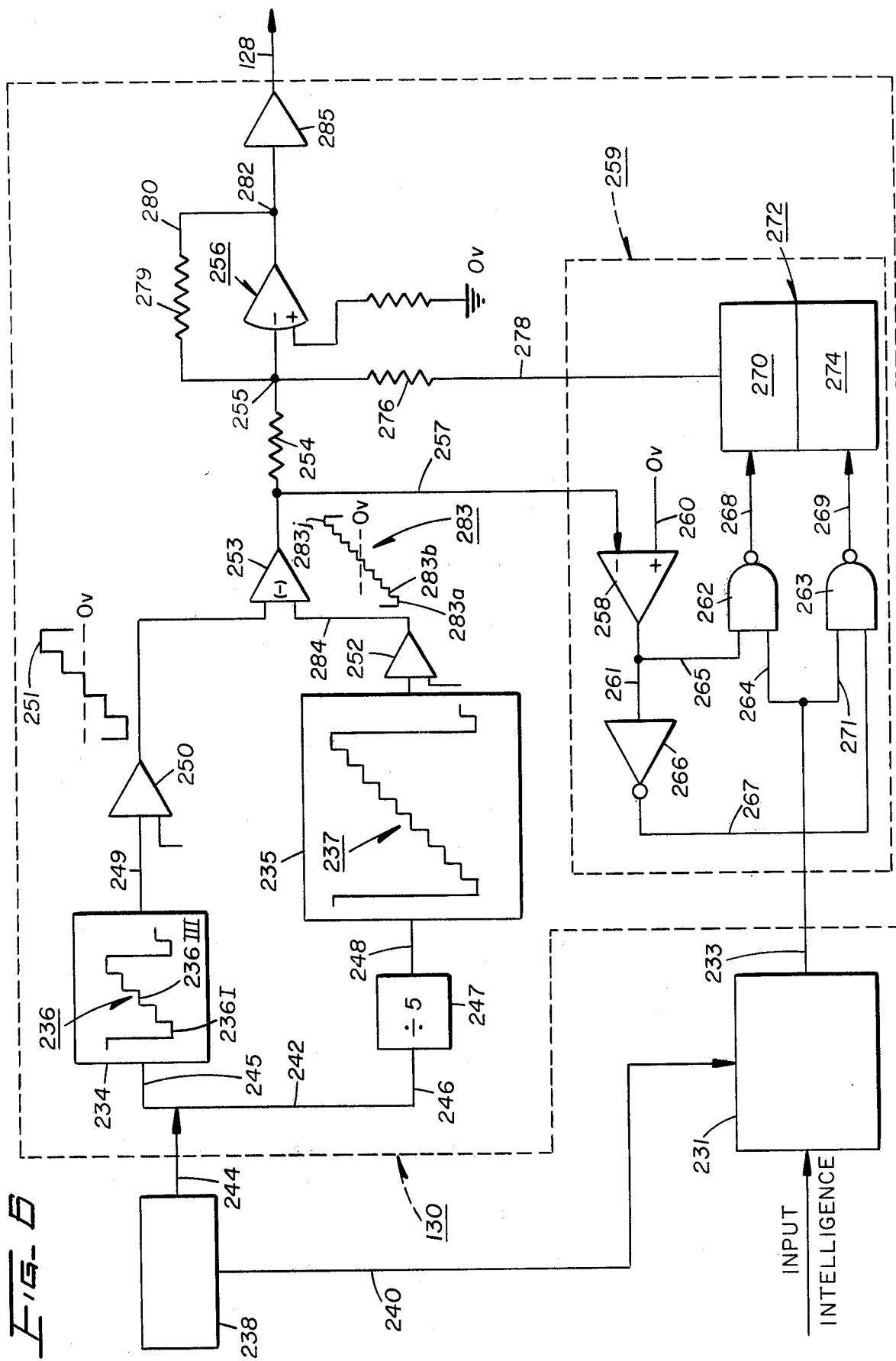
FIG. 6 is an electrical scheme of means for charging the drops in accordance with the invention.

A charging tunnel or electrode 126 in the form of an annulus is disposed downstream of the nozzle 114 concentrically with axis 112. It is connected through a lead 128 to the output of a function generator assembly 130 (FIG. 1 and 6), for charging each of the drops 1–50 in a set (FIGS. 2 and 3), from an uninterrupted succession, with a differential voltage according to the desired position such drop is to impinge the carrier 118.

An electrostatic field uniformly disposed about the axis 112 is generated downstream of the charging electrode 126 by a pair of deflecting parallel electrodes 132 and 134 which are connected to the opposite sides of a d.c. source, such as a battery 136. The electrodes are equally spaced laterally from axis 112 and disposed in a pair of planes perpendicular to segment 120. The propelled ink drops will be deflected by the coaction between the electrostatic field generated across electrodes 132 and 134 and the field about the drops resulting from the charge applied as the drops move through electrode 126.

In the present invention, as well as in the prior art, each ink drop from the issued stream and in a writing mode bears a charge within a selected range and will be deflected transversely of axis 112 and pass through an opening 142 between a pair of masks 138 and 140 to reach segment 120 at a matrix position corresponding to its charge. Each drop in a non-writing mode bears a charge beyond the deflection range for writing. Herein, such last drops are deflected against a selected one of the masks 138 and 140. They bound the opening 142 and are disposed downstream of the electrodes 132 and 134 and upstream of carrier 118. An ink catcher 139 is disposed below the masks. It may be provided with an opening 141 for returning the ink, which flows from the masks, to a reservoir (not shown) which is fluidally connected to the nozzle 114.

A line trace of ink of substantially equally spaced apart ink drops extending transversely of the direction (shown by arrow 148) in which carrier 118 is advanced, may be formed on said carrier from an uninterrupted succession of ink drops bearing incrementally increased (stepped) voltages within the writing range. The drop charging is achieved by stepping the voltages on the electrode 126 at the same frequency as the drops are generated. By selectively deflecting drops from an uninterrupted sequence against one of the masks 138 and 140, a line trace formed as aforesaid will be selectively interrupted. By incrementally moving carrier 118 following application thereto of each of a succession of traces of varying lengths, selected characters may be generated on the carrier 118.

A driven platen 146 against which the carrier 118 is disposed and frictionally engaged comprises means for advancing the carrier. The platen and the masks 138 and 140 are conductively connected together through a pair of conductors 149 and 150. They are also connected to a plane of reference, herein shown as ground 144, through a lead 151. Thereby, the building of charges about the masks 138 and 140, the carrier 118, and the platen 146, and transferred thereto by the charged drops is prevented, as such built charges would undesirably affect the drops in their intended path of movement.

In accordance with the present invention, for writing, generating, producing, or drawing a single straight line transversely of the direction indicated by arrow 148 with a set (being an uninterrupted succession) of ink drops 1–50, in a writing mode, issued from a single nozzle 114, a plurality of waves a–j (herein shown as ten) of ink drops 1–50 are generated (FIGS. 2 and 3). Each of the waves $a$–$j$ contains an equal plurality of drops (herein shown as five). The reference numerals 1–50 which identify these drops correspond to their order in succession of issuance. Each ink drop in each of the waves a-j has corresponding ink drops in other waves, in the following sense: Drops 1, 6, 11, 16, and each fifth drop in the succession thereafter through 46 correspond each to the other. Drops 2, 7, 12, 17, and each fifth drop in the succession thereafter through 47 correspond each to the other, and so on. During the application of ink drops 1–50 to the carrier 118, carrier movement preferably is interrupted to the end that all of the drops 1–50 will be disposed in a horizontal (rather than in a sloping) single line, the position of each drop within the line being determined by the charge applied thereto by electrode 126.

Figure 5:
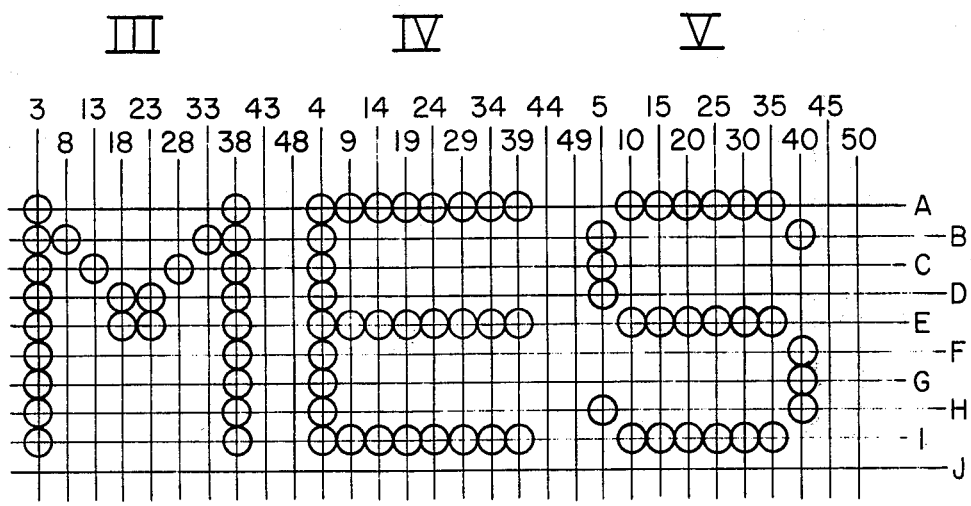
FIG. 5 is an enlarged frontview of a section of the carrier shown in FIG. 1.

The ink drops 1–50 are charged such that they are deposited at a plurality (herein being five) of transversely and equally spaced stations I–V on carrier 118. In practice each station may define the matrix of an alphanumeric character. At each of the stations I–V there are a plurality of dot positions, sites, or locales. In FIG. 5 each of the positions, sites and locales in a line is identified by the reference numeral (1–50) which would identify one of the ink drops 1–50 which would occupy such position, site, or locale. Each drop in each of the waves a-j is applied to a different one of the stations I–V. Corresponding drops are deposited on the carrier 118 at the same station, though at different places at such stations. The stations are equally spaced apart and though the places at the stations are shown equally spaced apart, they need not be, as they may overlap.

The order of the stations I–V at which the successive drops in a wave impinge carrier 118 are preselected. Though such order is linear in the exemplary process, it need not be. For example, in the exemplary process, drops 1–5 of a wave will be deposited at positions at stations I–V, with drop 1 being deposited at station I and drop 2 being deposited at station II, and drop 3 being deposited at station III, and so on. However, drop 1 might be deposited at some station other than station I, drop 2 might be deposited at some station other than station II, and so on, provided that not more than one drop from a wave is deposited at one station. Moreover, corresponding drops in each of the waves $a$–$j$ will be deposited at their stations in the same order.

FIG. 3 represents the evolution of a single line according to the present invention showing successive stages following the deposition of the drops in each of the waves $a$–$j$ according to one order. The first stage is uppermost in FIG. 3 and the last stage is lowermost. Tha is to say, the first line in FIG. 3 represents the condition of the carrier following deposition of drops 1–5 from wave a. The second line of FIG. 3 represents the condition of the same line on the carrier following the deposition of the drops 6–10 from wave $b$, and so on until the lowermost line in FIG. 3 represents the condition on the same line following deposition of all of drops 1–50 from all of the waves a–j.

The drops are charged such that drop 1 from wave a is deposited at a position at station I, drops 2 is deposited at a position at station II and so on, through drop 5 which is deposited at a position at station V. Drops 6 through 10 from wave b, accordingly, are deposited at stations I through V. Though, each of the drops 6 through 10, is deposited on carrier 118 in the same order as corresponding drops from wave a, it is charged such that its site at its respective station is at a different place and in alignment with corresponding drops from other waves a–j previously applied to carrier 118. Drops 11 through 15 are charged such that they are deposited at stations I through V in the same order as corresponding drops from other waves a–j though at locales which are at different places from other drops at said stations. In consequence, with no drops in the set of drops 1–50 in a delete mode, and the voltage charge on each being stepped in accordance with the invention, drops 1–50 will be deposited in a straight line, each drop being at a different place (herein being illustrated as equally spaced) from an adjoining drop, as shown in the lowermost line of FIG. 3.

It is noted, in recapitulation, that: (1) charged elements 1–5 in a first succession (wave a) are deposited at a plurality of positions, respectively, at successive stations I–V on carrier 118 with each station spaced from and aligned with the others; (2) charged elements 6–10 in a second succession (wave b) are deposited on carrier 118 at a plurality of sites at said stations I–V, respectively, and in the same sequence as corresponding elements in the first succession, each site spaced from and in alignment with the others and at a different place from the position at which the corresponding element from the first succession is applied on carrier 118. Likewise, the elements 11–15 in a succeeding succession are deflected to respective locales at stations I–V, each locale being spaced from and in alignment with each of the other locales and being at a different place from the position and sites at its station so that no two elements occupy exactly the same place on the carrier. Moreover, in consequence of the foregoing, the stations, sites and locales, may be equally spaced apart, though this characteristic is not a limitation on the invention.

Restated, ink drops 1–50 in a set are charged to form a plurality of consecutive waves a–j, and impinge carrier 118 along a single line. Each ink drop in a wave is deposited in a discrete position at a station along the line to space corresponding drops from successive waves in a line at different places.

Figure 4:
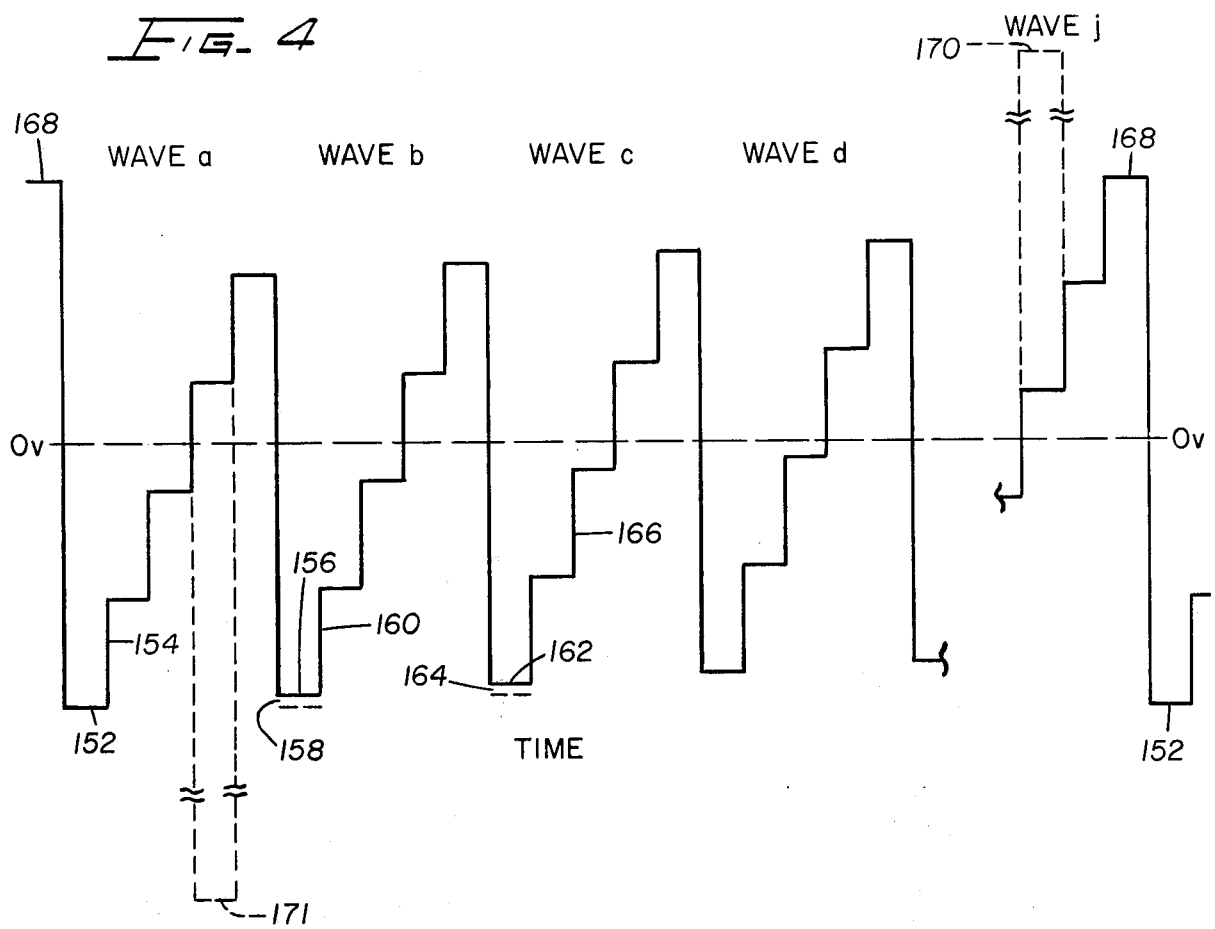
FIG. 4 is a graphic representation of the voltage wave form for charging the drops to form the drop waves of FIG. 2, alternate voltage levels for charging selected drops in a nonprint mode being shown in dashed lines.

To produce the straight line illustrated in FIG. 3, the voltage is cycled ten times according to the voltage wave forms of FIG. 4, each cycle for charging the drops to form one of the drop waves a–j. To produce drop wave a, a voltage at a selected level 152 is applied to electrode 126 for charging drop 1, in a known manner. The voltage is then stepped by selected equal increments 154 for charging each of the successive drops 2–5 such that, when drops 1–5 coact with the electrostatic field, they will be deflected into wave a for impinging carrier 118 in a line traversing stations I–V.

Thereafter, the voltage is dropped to the lowest level 156 for repeating the cycle to charge drops 6–11 with voltages which are stepped by equal increments 160, each of which equal to an increment 154. Level 156 is greater than level 152, by an increment 158 which is a fraction of an increment 154 or 160. Accordingly, in the illustrated embodiment, the drops 6–10 will be applied at their sites on carrier 118, in the same order as the corresponding drops 1–5 were applied at their positions. However, as drops 6–10 also will be charged at a level higher by increment 158, then correspondingly charged drops from drop wave a, the sites of the drops 6–10 on carrier 118 will be removed from the positions of drops 1–5.

The charging voltage will next drop to a level 162 to be stepped in equal increments 166 for charging the drops in wave c. The level 162 is higher than level 156 by an increment 164 which is equal to the increment 158. Each of the increments 166 is equal to an increment 154 or 160.

The voltage wave form for charging each ensuing drop wave d–j is identical, that is to say, the voltage wave form for charging the ink drops in each wave a–j is the same as the voltage wave form for charging the drops in each of the other drop waves. But the base voltage, being the voltage level for charging the first drop (6, 11, 16, etc.) in each drop wave b–j is incrementally greater than the base voltage of the preceding wave a–i by an increment equal to any of the increments 158 and 164. Following the generation of the voltage at level 168 for charging the last drop 50 in the set of drops, the voltage level drops to base level 152 for charging the drops of an ensuing wave set to apply the drops on a second line B (FIG. 5) of carrier 118.

The total of the increments 158, 164, by which the base voltage levels for charging the first drop in waves b–j is increased over voltage level 152 is less than the incremental increase 154, 160, or 166, between two next adjoining drops in an uninterrupted succession in any of waves a–j. Herein, increment 154 is ten times increment 158. In consequence, corresponding drops in each wave a–j will be directed toward the same station. Whereas, different drops in a given wave will be directed to different stations.

A wide range of writing which includes printing and the production of patterns, characters, designs, and symbols, can be effected in accordance with the present invention. Herein, the matrix on carrier 118 of each written alphanumeric character (FIGS. 1 and 5) is found within the limits of one of the stations I–V. Though, each matrix has a plurality of lines A–K on each of which a set of drops 1–50 can be impinged when charged as aforesaid. A drop delete or omit charge, having a voltage level of 170 or 171 (dashed lines of FIG. 4), is applied to each drop which is to be in a non-writing mode. In a set of drops 1–50, a voltage at level 171, applied at the place in the cycle indicated will result in deletion of drop 4. A voltage at level 170, applied at the indicated place in the voltage cycle will result in deletion of drop 48.

To print or write the legend illustrated in FIG. 1, a portion which is shown in FIG. 5, carrier 118 is advanced to align line A with nozzle 114 and is then stopped. From a set of drops 1–50 (which would trace a line according to FIG. 3 if in a writing mode), only drops 36 (for the letter J); 12, 17, 22, and 27 (for the letter A); 3 and 38 (for the letter M); 4, 9, 14, 19, 24, 29, 34, 39 (for the letter E); and 10, 15, 20, 25, 30, and 35 (for the letter S) will be charged for writing. The remainder of the 50 drops will be charged with one of the delete voltages (dashed lines of FIG. 4). Thereafter, following incremental advance of the carrier 118 for writing on line B, only drops 36 (for the letter J); 17 and 22 (for the letter A); 3, 8, 33, and 38 (for the letter M); 4, (for the letter E); and 5, and 40 (for the letter S) of the next succession of 50 drops will be charged for writing. The remainder of the drops will be charged for deletion; and so on, to complete the legend.

The exemplary function generator assembly 130 (FIGS. 1 and 6) is responsive to a character data transmitter 231 to which it is connected by a conductor 233. The character data transmitter is adapted to produce digital signals corresponding to input intelligence, the digital signals being converted into analog signals as an output of the function generator assembly 130 in lead 128 for charging electrode 126. The analog signals transmitted to electrode 126 may be synchronized with drop frequency such that each drop will be appropriately charged for deflection either to an appropriate place on carrier 118 or against one of the masks 138 and 140. The mechanisms for synchronization may be of the same class as the synchronization mechanism which is disclosed in U.S. Pat. No. 3,298,030 issued Jan. 10, 1967 to A. M. Lewis, et al. Therefore, further description thereof has been omitted.

The assembly 130 comprises a first voltage or function generator 234 and a second voltage or function generator 235. Each of said generators 234 and 235 is adapted cyclically to generate a respective one of the outputs 236 and 237, each being a stepped voltage, which is to say, a succession of voltage levels which is incrementally increased from a preceding voltage level. The function generators may have substantially the same construction as the function generator disclosed in the aforesaid U.S. Pat. No. 3,298,030. The outputs 236 and 237 are synchronized with the output of the character data transmitter 231 by a clock frequency. To that end a clock pulse generator 238 is connected to the character data transmitter 231 by a conductor 240 and to a twin lead 242 by a conductor 244. One terminal of twin lead 242 imposes the clock signal directly on the function generator 234, and the other terminal 246 imposes the clock signal on a gated binary counter 247 which comprises signal dividing means.

Function generator 234 is adapted to generate an output for and in synchronism with each drop which is formed from the ink issuing stream. Each voltage level is imposed on one of the drops in each of the drop waves a–j. In the illustrated embodiment a voltage cycle of function generator 234 comprises five steps after which the voltage is recycled. Each step of output 236 corresponds to one of the stations I–V; and the increment between steps in output 236 corresponds to one of the increments 154, 160, 166, etc.

Gated binary counter 247 imposes its output signal on function generator 235 through a lead 248. In the exemplary embodiment counter 247 divides the clock signal by five; and thereby, it produces an actuating output signal for each fifth clock pulse. In response to each actuating signal through lead 248, function generator 235 will incrementally increase its level of output 237 through a cycle after the highest step 237j of which the cycle will be repeated.

In the illustrated embodiment each cycle of function generator 235 comprises ten steps. Each of said steps corresponds to a place at one of the stations I–V; and the increment between steps in output 237 corresponds to one of the voltage increments 158, 164, etc. Each voltage level in output generator 237 is imposed on all of the drops in a corresponding one of the drop waves a–j, the lowest level 237a of output 237 being imposed on the drops of wave a, the second level 237b being imposed on the drops of wave b, and so on.

The lowest levels 236I and 237a of outputs 236 and 237 herein are shown as being zero volts. The increment from step to step of each of outputs 236 and 237 is the same as the increment from step to step of the other output. To produce the voltage wave forms of FIG. 4, output 236 is connected by a lead 249 to a non-inverting summing amplifier 250 having a gain of 10. There the output 236 is (a) shifted such that its third step 236III is at zero volts, its lower steps are at a negative voltage, and its upper steps are at a positive voltage, and (b) the shifted output is multiplied by 10 at each level to produce a signal 251 which is congruent with the voltage wave form (FIG. 4) for charging the drops in drop wave a. The output 237 is connected to a non-inverting level shifter 252 such that its output signal 283 is symmetrical about zero volts.

In consequence of the foregoing, as a succession of a set of drops 1–50 are issued, signal 251 will be cycled ten times. To each step of the signal 251 during its first cycle, a voltage having a level 283a through lead 284 will be added at an inverting summing amplifier 253 for generating the voltage wave form (FIG. 4) for producing ink drop wave a. To each step of signal 251 during its second cycle, an increment of voltage represented by the level 283b will be added at the summing junction for forming the voltage wave form (FIG. 4), for producing ink drop wave b; and so on through the tenth cycle of the function generator 234. In that cycle a voltage 283j will be added to signal 251 at the summing amplifier 253. The increment by which voltage increase from step to step in output 237 or 283 is only one-tenth of each incremental increase in signal 251. As a result, corresponding drops from successive waves will all be applied at the same station (but at different places), while successive drops in the same wave will be applied at respective different stations.

The output from the summing amplifier 253 is applied through a resistance 254 to a summing junction 255 of an operational amplifier 256. The output of the summing amplifier 253 is also applied as an input through a lead 257 to signal comparing means, such as signal inverting differential amplifier 258, of a delete generator 259. In the delete generator, its input is compared with a reference voltage, herein being zero volts supplied to amplifier 258 through a lead 260. When the input in lead 257 is high (above zero volts) the output of amplifier 258 in conductor 261 will be low. Contrarywise, when the output of amplifier 258 is low (below zero volts) the output in conductor 261 will be high.

In the illustrated embodiment, the output signal of character data transmitter is low (negative) in conductor 233 for each drops 1–50 in a set which is to be charged in a writing mode and is high (positive) for each of the drops which is intended to be deflected against one of the masks 138 and 140. The output signal in conductor 233 is imposed on one terminal of each of a pair of NAND-gates 262 and 263, respectively, through leads 264 and 271.

The output in conductor 261 is imposed on the other terminal of NAND-gate 262 through a lead 265. It is also imposed, inverted by inverter 266, on the other terminal of NAND-gate 263 through a lead 267. Accordingly, a voltage of signal 251 above the reference level (zero volts) will be seen by gate 262 as a high (positive) signal and by gate 263 as a low (negative)

signal. On the other hand, a voltage of signal 251 below the reference level will be seen by gate 262 as low (negative) and by gate 263 as high (positive).

In the illustrated embodiment, when either of inputs to either of the NAND-gates 262 and 263 is negative, its output in a corresponding one of connectors 268 and 269 is positive. On the other hand when both inputs to either gate are positive, then the output in the respective one of connectors 268 and 269 will be negative. Therefore, upon a non-print (positive) signal in conductor 233, output in connector 268 will be negative when the algebraic sum of signals 251 and 283 is high; and output in connector 269 will be negative when the algebraic sum of signals 151 and 283 is low.

A low (negative) voltage generating component 270 of a voltage assembly 272 is responsive only to a negative voltage in connector 268. A high voltage generating component 274 of assembly 272 is responsive only to a negative voltage in connector 269. As a result, assembly 272 will discharge through resistance 276 in the output conductor 278 of delete generator 259 only when the signal in conductor 233 is positive (non-print). Then component 270 will provide a low (negative) voltage when the algebraic sum of signals 251 and 283 is high, and the component 274 will provide a high (positive) voltage when the algebraic sum of signal 251 and 283 is low.

The conductor 278 imposes the output of the delete generator 259 at the summing junction 255 through a resistance 276. A resistance 279 in the feedback loop 280 of operational amplifier 256 is the same as the resistance 254. As a result, when no signal is present in conductor 278, a condition which obtains whenever the output in conductor 233 is negative (write mode), the voltage at junction 282 and on electrode 126 will be of the same magnitude as the voltage in junction 255 but with its value inverted.

However, resistance 276 is a fraction of resistance 279, the ratio of the resistances being selected for driving amplifier 256 to its saturation upon passage of current in conductor 278. The amplifier 256 is selected such that at its opposite saturation levels, a voltage will be applied at junction 282 and, accordingly a corresponding voltage at the charging electrode 126 which is at one of the levels 170 and 171 (FIG. 4), beyond the voltage levels 152 and 168 which define the limits of the range of voltage for producing a writing mode. When a positive or high voltage comprises the output of the delete generator 259, a negative voltage will develop at junction 282 and a corrsponding voltage at level 171 will develop at the charging electrode 126. Whereas, if a negative voltage is generated by the delete generator, a positive voltage will be developed at junction 282 and a corresponding voltage at level 170 will develop at the charging electrode 126.

In practice, as the signal at junction 282 is weak, an amplifier 285 is coupled in the circuit between said last junction and electrode 126.

By reason of the foregoing, the likelihood of attraction between drops, one of which has been charged at one end of the voltage range for writing and a successive drop which has been charged, according to conventional practice, at the opposite end of the range, for delete has been obviated. In accordance with the disclosure, a voltage for charging an ink drop to be deleted has the same polarity as the voltage would have had were it to have charged such drop for writing.

As many modifications in the described process and construction could be conceived, and as many widely different embodiments of the invention could be made without departing from the spirit and scope of the claims, it is intended that all matter contained in the accompanying specification shall be considered as illustrative only and not in a lmiting sense.

I claim:

1. In a writing process wherein electrically charged elements from a stream are deflected electrostatically in a span between an issuing member and a carrier for records for producing thereon a pattern, the steps in producing a line on the carrier comprising:
    directing the charged elements in a first succession to a plurality of positions, respectively, at each of a succession of stations on said carrier, each station spaced from and aligned with the others; and
    directing the charged elements, respectively, in a second succession to a plurality of sites at said stations, respectively, and in the same sequence as corresponding drops in the first succession, each site spaced from and in alignment with the others and located at a place different from the position at its station.

2. The combination of claim 1 further characterized by the step of directing each drop in a third succession to one of said stations to a locale spaced from and in alignment with each of the other locales and located at a place different from the position and site at its station 3. The combination of claim 2 wherein the stations are equally spaced apart, the positions are equally spaced apart, the sites are equally spaced apart, and the locales are equally spaced apart.

4. The combination of claim 1 wherein the stations are equally spaced apart.

5. The combination of claim 1 further characterized by the steps of:
    charging each element with a different voltage, the charge difference applied to the drops in each succession being greater than the charge difference applied to drops at the same station; and
    passing the charged elements through an electrostatic field across which there is maintained a constant voltage for deflecting said charged elements into a plurality of waves.

6. A combination according to claim 5 characterized by:
    uniformly stepping the voltage for charging successive element in each wave; and
    charging a corresponding element in each wave with a different voltage corresponding to the wave from which such element derives.

7. In an ink jet writing process wherein electrically charged ink drops from a stream are deflected by an electrostatic field in a span between an issuing member and a carrier for records for impinging selected ink drops on said carrier to produce a pattern, the combination comprising:
    forming a plurality of consecutive waves of drops for impinging the carrier along a single written line; and
    applying each drop in a wave at a discrete position at a station along said line to place corresponding drops from successive waves in said line at different locations at the same station.

8. A combination according to claim 7 further characterized by charging successive drops from said stream in each wave with a stepped voltage.

9. A combination according to claim 8 further characterized by charging corresponding drops in successive waves with incrementally different voltages.

10. A combination according to claim 9 wherein the sum of the increments of voltage between corresponding drops in all the waves in a line is less than the difference in voltage between a pair of successive drops in any wave.

11. In an ink jet writing process wherein electrically charged ink drops from a stream are deflected by an electrostatic field in a span between an issuing member and a carrier for records for impinging selected ink drops on said carrier at a plurality of equally spaced apart stations to produce a line, the combination of steps comprising:
  directing the drops in a first succession thereof to said stations, respectively, and in a selected order;
  directing the drops in each successive succession thereof to said stations, respectively, in the same order and at a different place from the drops directed to the carrier in a preceding succession.

12. A combination according to claim 11 further characterized by directing the drops for impinging the carrier at each station in the same order as the drops impinge the carrier at each of the other stations.

13. In an ink jet writing process wherein a succession of electrically charged drops from an axial stream coact with an electrostatic field between an issuing member and a carrier for records to deflect selected ink drops in a writing mode along said carrier in response to a range of voltages, to produce thereon a pattern, characterized by:
  deflecting others of said drops in a delete mode in selected of two paths away from said carrier according to the level of the charge on an adjoining drop in a writing mode in said succession.

14. A process according to claim 13 characterized by applying the ink drops in a writing mode on said carrier in a plurality of sweeps: and wherein drops in a delete mode adjoining drops in a writing mode at one end of a sweep are deflected in one of said paths and drops in a delete mode adjoining drops in a writing mode at the other end of a sweep are deflected in the other of said paths 15. In an electrostatic printer of the type wherein a stream of ink issued along an axis under pressure breaks into drops which become charged with a stepped signal cyclically generated for generating a line trace on a carrier in response to a first function generator, the improvement comprising:
  a second function generator having a stepped output;
  means for coupling each step of said stepped output to said stepped signal during each cycle to generate a plurality of drop waves for impinging the carrier along a single line.

16. A combination according to claim 15 further characterized by means connected to said first function generator for amplifying each increment between steps of said stepped signal by a factor greater than 1 times the increment between a pair of successive steps of said stepped output.

17. A combination according to claim 15 further characterized by means for adjusting the level of the output of said second function generator by a single step for each cycle of said stepped signal.

18. A combination according to claim 17 wherein said adjusting means comprises:
  a signal dividing member connected to said second function generator; and
  a clock signal source connected to said signal dividing member and said first function generator, said stepped signal being stepped in response to a clock signal from said source.

19. In an electrostatic printer of the type wherein a cycled stepped voltage within a range of opposed polarities is applied to an uninterrupted succession of ink drops for electrostatic deflection thereof into a writing mode to impinge a carrier spaced from an ink issuing sources for tracing a line thereon and wherein a delete voltage beyond said range is applied to selected ink drops in a succession for electrostatic deflection thereof and out of a writing mode, the improvement comprising means on both sides of the area occupied by droplets in a writing mode for capturing droplets deflected out of the writing mode, and means for applying a delete voltage of either of two polarities, the polarity of the delete voltage applied being of the same polarity of said selected drops as the polarity of the voltage would have been were such last named drops to have been deflected into a writing mode.

20. A combination according to claim 19 wherein said applying means comprises:
  means for charging said selected drops with a positive delete voltage if their order of succession would have required then to be charged positively for deflection into a writing mode; and
  means for charging said selected drops with a negative delete voltage if their order of succession would have required them to be charged negatively for deflection into a writing mode.

21. A combination according to claim 19 wherein said applying means comprises:
  means for producing said stepped voltage in repeated cycles; means for composing the instantaneous of said stepped voltage with a reference signal; and
  means for generating a delete voltage in response to the comparing means.

22. A combination according to claim 21 characterized by:
  a digital signal generator responsive to input intelligence for providing a first output corresponding to an ink drop to be charged with a voltage within said range and a second output corresponding to an ink drop to be charged beyond said range; and wherein generating means comprises:
  a delete generator including a gated assembly connected to said digital signal generator for producing a first electrical effect if the delete voltage is to be of one polarity and a second electrical effect if the delete voltage is to be of an opposite polarity; and
  means responsive to said first and second signals for generating delete voltages of opposed polarities.

23. In an ink jet printing apparatus an arrangment for reducing drop merging and splatter, comprising:
  nozzle means for forming and propelling a plurality of ink jet drops toward a record medium, means or charging ink drops with code representations, means for deflecting said ink drops in accordance with the charge on said drops, said drops being deflected in successive columns, each column on said record medium comprising a set of a predetermined number of drop locations;
  cycling means operable in at least two cycles for each column of printing for controlling said nozzle means and said charging means; said cycling means being operable in at least a first cycle of operation for controlling said nozzle means and said charging means to selectively propel said ink jet drops toward selected ones only of said drop locations on said record medium comprising less than a set of drop loations, and said cycling means being further operable in another of said at least two cycles for controlling said nozzle means and charging means to selectively propel said ink jet drops toward other drop locations on said record medium not previously selected in said first cycle of said at least two cycles of operation, said other drop locations comprising the remainder of a set of drop locations for each said column.

24. The apparatus of claim 23, wherein said cycling means include:

nozzle control means for activating said nozzle means and said charging means during a first drop printing cycle for each column to direct drops toward odd numbered drop locations on said record medium and during a second drop printing cycle for each column to direct drops toward even numbered drop location on said record medium, the skipping of alternate drop locations thereby minimizing merging and splatter effects.

25. The apparatus of claim 23, wherein: said cycling means comprises a stairstep generator.

26. The apparatus of claim 23, wherein: said cycling means comprises a digital to analog convertor and associated counter means.

27. In a writing process wherein electrically charged elements from a stream are deflected electrostatically in a span between an issuing member and a carrier for records, the steps for producing thereon a pattern comprising:

directing the charged elements in a first succession to a plurality of positions, respectively, at each of the succession of stations on said carrier, each position spaced from the aligned with the others; and directing the charged elements in a second succession to a plurality of sites at said stations, respectively, and in the same sequence as corresponding drops in the first succession, each site spaced from and in alignment with the others and located at a place different from the position at its station.

28. In a writing process wherein electrically charged elements from a stream are deflected electrostatically in a span between an issuing member and a carrier for records, the steps for producing thereon a pattern comprising:

directing the charged elements in a first succession to a plurality of positions, respectively, at each of a succession of stations on said carrier, each position spaced from and aligned with the others; and directing the charged elements in a second succession to a plurality of sites at said stations, respectively, and in the same sequence as corresponding elements in the first succession, each site spaced from and in alignment with the others and located at a place different from the position at its station, at least one of said positions being located between two of said sites.

* * * * *

UNITED STATES PATENT AND TRADEMARK OFFICE
CERTIFICATE OF CORRECTION

PATENT NO. : 4,034,379
DATED : July 5, 1977
INVENTOR(S) : JAMES M. BERRY

It is certified that error appears in the above-identified patent and that said Letters Patent are hereby corrected as shown below:

Column 4, line 63, change "Tha" to --That--.
Column 10, claim 6, line 49, change "element" to --elements--.

Column 12, claim 21, line 37, change "composing" to --comparing--.
Column 12, claim 21, line 37, after "instantaneous" insert --level--.
Column 12, claim 22, line 47, after "wherein" insert --said--.
Column 12, claim 23, line 60, change "or" to --for--.
Column 13, claim 23, line 7, change "loations" to --locations--.

Column 14, claim 27, line 9, change "the" (1st occurrence) to --and--.

Signed and Sealed this

Fifth Day of February 1980

[SEAL]

Attest:

SIDNEY A. DIAMOND

Attesting Officer    Commissioner of Patents and Trademarks